J. B. COLVIN.
AUTOMATIC HEAD LAMP CONTROL.
APPLICATION FILED NOV. 7, 1914.
1,137,700.
Patented Apr. 27, 1915.
2 SHEETS—SHEET 1.
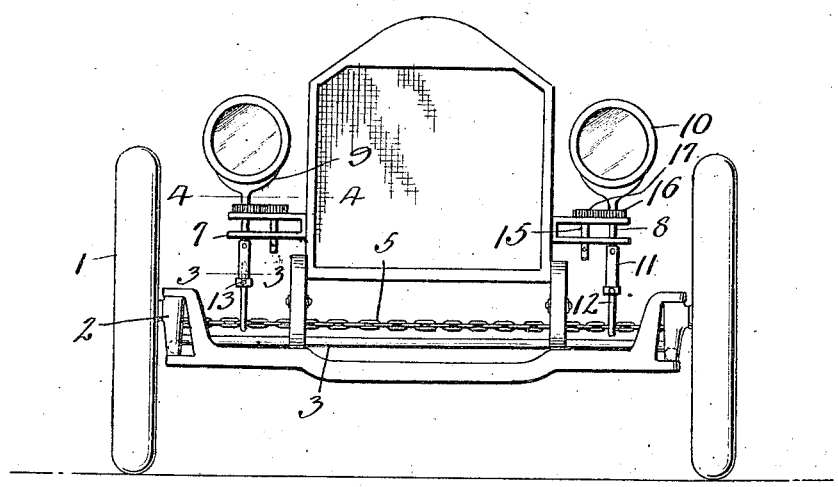
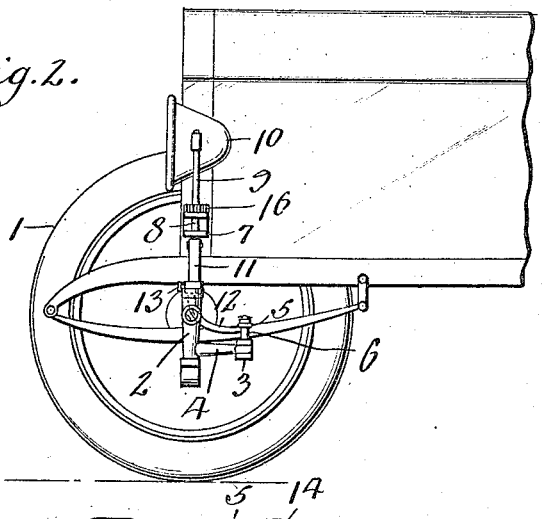
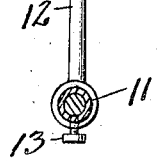
Witnesses
Inventor
J. B. Colvin,
By Victor J. Evans
Attorney

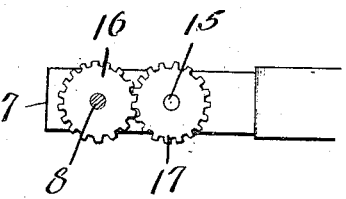
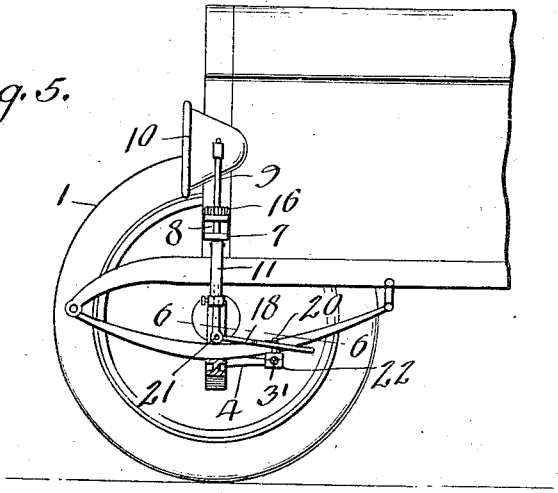
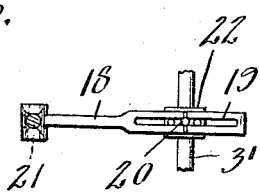
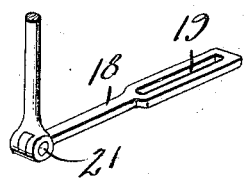
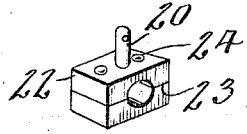

UNITED STATES PATENT OFFICE.

JOHN B. COLVIN, OF DUNDEE, MISSISSIPPI.

AUTOMATIC HEAD-LAMP CONTROL.

1,137,700.  Specification of Letters Patent.  Patented Apr. 27, 1915.

Application filed November 7, 1914. Serial No. 870,847.

*To all whom it may concern:*

Be it known that I, JOHN B. COLVIN, a citizen of the United States, residing at Dundee, in the county of Tunica and State of Mississippi, have invented new and useful Improvements in Automatic Head-Lamp Controls, of which the following is a specification.

This invention relates to automatic head-lamp controls, the broad object of the invention being to provide in connection with the steering apparatus of a motor car, means whereby the headlamps or search lights are turned automatically in connection with the steering apparatus so as to throw the rays of light along that part of the road which is about to be followed by the machine in accordance with the angle to which the steering wheels are turned, the road way being illuminated properly irrespective of whether the machine is following a straight or curved path.

With the above general object in view, the invention consists in the novel construction, combination and arrangement of parts, as herein described, illustrated and claimed.

In the accompanying drawings:—Figure 1 is a front elevation of an automobile showing the lamp turning mechanism of this invention mounted thereon. Fig. 2 is a side elevation partly in section of the same. Fig. 3 is a horizontal section on the line 3—3 of Fig. 1. Fig. 4 is a horizontal section on the line 4—4 of Fig. 1. Fig. 5 is a vertical longitudinal section showing another form of the invention. Fig. 6 is a horizontal section on the line 6—6 of Fig. 5. Fig. 7 is a detail perspective view of the operating arm showing also a portion of one of the lamp posts. Fig. 8 is a detail perspective view of the clip which attaches to the connecting rod of the steering knuckles.

Referring to the drawings 1 designates the steering wheels of a motor car, 2 the steering knuckles thereof and 3 the connecting rod which is attached at its opposite ends to arms 4 of the steering knuckles 2, said parts being of the usual construction and arrangement.

In carrying out the present invention, in the preferred embodiment thereof, I employ a flexible element such as a chain 5 the opposite extremities of which are attached to the arms 4, being shown as fastened to pins 6 extending upwardly from said arms.

At opposite sides of the machine there are arranged bearings 7 for a pair of substantially vertical lamp shafts 8, said shafts being journaled in said bearings to turn on vertical axes. The shafts 8 are provided with the usual forks or brackets 9 at their upper ends which carry the head lamps or search lights 10.

Detachably fastened to the lower extremity of each of the lamp shafts 8 is a tubular extension shaft 11 and fastened to the lower end of said extension shaft is an arm 12 adjustable longitudinally and axially of the extension shaft 11 by means of a set screw 13.

The arm 12 is attached at its extremity to the chain 5 by means of a pin 14 or its equivalent so that as the chain 5 moves simultaneously with the rod 3, movement is imparted to the arms 12 of both of the lamp shafts 8.

Parallel to each of the lamp shafts 8 is a counter-shaft 15 also journaled in one of the bearings 7, the shafts 8 and 15 being respectively provided with spur gear wheels 16 and 17 so that when one shaft is turned in one direction, the other shaft is simultaneously turned in the opposite direction. The two shafts 8 and 15 are provided in connection with each of the head lamps in order to adapt the mechanism to the two different types of steering gears, one in which the connecting rod 3 is arranged in front of the axle and the other in which said connecting rod is located in rear of the axle. The construction described enables the extension shaft 11 and arm 12 to be fastened to either the shaft 8 or the shaft 15 and consequently the arm 12 may be extended either forwardly or rearwardly to connect with the steering knuckle connecting rod 3.

Another form of the invention is illustrated in Figs. 5 to 8 inclusive, the only difference residing in the omission of the flexible chain 5 and the provision of a jointed arm 18 which is used in place of the arm 12 hereinabove described. This arm 18 is provided with a longitudinal slot 19 which receives a pin 20 directly on the connecting rod 3'. The other end of the arm 18 is connected by a horizontal pivot 21 with the lower extremity of the lamp shaft in order to provide for the relative up and down movement of the connecting rod 3' and the body of the vehicle upon which the bearings 7 for the lamp shafts are mounted. The pin 20 is shown as formed on a clip 22 which is centrally divided as shown at 23 to adapt the same to be placed laterally upon the connecting rod 3, the two parts of the clip 22 being bolted or otherwise fastened together as indicated at 24.

From the foregoing description taken in connection with the accompanying drawings it will now be seen that when the operator turns the steering wheels, the headlamps are simultaneously turned to a corresponding angle so as to illuminate that part of the road way which is to be traveled by the machine. Under the present day arrangement of headlamps, they are held rigidly and the light is thrown directly ahead in line with the body of the machine instead of being thrown to that side to which the steering wheels are directed.

What I claim is:—

1. Automatic headlamp controlling mechanism comprising, in combination with the connecting rod of the steering knuckles, a pair of vertical lamp shafts on which the headlamps are mounted to turn therewith, bearings in which said shafts are journaled, countershafts parallel to said lamp shafts and geared thereto to turn in the opposite direction, extension shafts adapted to be fastened either to said lamp shafts or counter shafts and provided with operating arms and means connecting the steering knuckles and also connected with the arms of the extension shafts.

2. Automatic headlamp controlling mechanism comprising, in combination with the connecting rod of the steering knuckles, a pair of vertical lamp shafts on which the headlamps are mounted to turn therewith, bearings in which said shafts are journaled, countershafts parallel to said lamp shafts and geared thereto to turn in the opposite direction, extension shafts adapted to be fastened either to said lamp shafts or counter shafts and provided with operating arms, and a longitudinally movable flexible element actuated by the steering knuckles and having said operating arms connected thereto.

In testimony whereof I affix my signature in presence of two witnesses.

JOHN B. COLVIN.

Witnesses:
L. E. MITCHELL,
C. V. MOORE.

Copies of this patent may be obtained for five cents each, by addressing the "Commissioner of Patents, Washington, D. C."